US008447720B1

(12) United States Patent
Rubin (10) Patent No.: US 8,447,720 B1
(45) Date of Patent: May 21, 2013

(54) ADAPTIVE CASE-BASED REASONING SYSTEM USING DYNAMIC METHOD FOR KNOWLEDGE ACQUISITION

(75) Inventor: Stuart H. Rubin, San Diego, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 626 days.

(21) Appl. No.: 12/755,268

(22) Filed: Apr. 6, 2010

(51) Int. Cl.
*G06F 9/44* (2006.01)
*G06N 5/02* (2006.01)

(52) U.S. Cl.
USPC .................................. 706/52; 706/46; 706/50

(58) Field of Classification Search
USPC .......................................................... 706/52
See application file for complete search history.

(56) References Cited

U.S. PATENT DOCUMENTS 7,047,226 B2   5/2006   Rubin

OTHER PUBLICATIONS

Rubin02, Kaser: A Qualitatively Fuzzy Object-Oriented Inference Engine [online], 2002 [retrieved on Dec. 11, 2012]. Retrieved from the Internet<URL:http://bluecoat-02/?cfru=aHROcDovL2Npd GVzZWVyeC5pc3QucHN1LmVkdS92aWV3ZG9jL2Rvd25sb2Fk P2RvaT0xMC4xLjEuMy45MDczJnJI       cD1yZXAxJnR5cGU9c GRm>.*
Rubin04, KASER: Knowledge Amplification by Structured Expert Randomization, 2004.*
DateForRubin02.*

Rubin, Stuart H., "On Randomization and Discovery", Journal of Informational Sciences, vol. 177, issue 1, pp. 170-191, Jan. 2007.
Rubin, Stuart H., "Computing With Words", IEEE Transactions on Systems, Man, and Cybernetics—Part B: Cybernetics, vol. 29, No. 4, pp. 518-524, Aug. 1999.
Rubin, S.H., Murthy, S.N.J., Smith, N.H., and Trajkovic, L., "KASER: Knowledge Amplification by Structured Expert Randomization," IEEE Transactions on Systems, Man, and Cybernetics—Part B: Cybernetics, vol. 34, No. 6, pp. 2317-2329, Dec. 2004.
Chaitin, G.J., "Randomness and Mathematical Proof," Sci. Amer., vol. 232, No. 5, pp. 47-52, 1975.
Rubin, Stuart H., Chen, S., and Shyu, M., "Field Effect Natural Language Semantic Mapping", IEEE International Conference on Systems, Man, and Cybernetics, vol. 3, pp. 2483-2487, Oct. 5-8, 2003.

* cited by examiner

*Primary Examiner* — Jeffrey A Gaffin
*Assistant Examiner* — Nathan Brown, Jr.
(74) *Attorney, Agent, or Firm* — Ryan J. Friedl; Kyle Eppele (57) ABSTRACT

A method includes receiving a user-specified context comprising one or more natural language contextual antecedents. Then, for each contextual antecedent, a modified contextual antecedent is created by converting each contextual antecedent to a sequence of integers using a word base. Each modified contextual antecedent is compared to each of a plurality of cases stored in a case base, where each case includes one or more case antecedents and one or more case consequents. The case antecedents and case consequents are stored in the case base as sequences of integers representing the respective case antecedents and case consequents. The case having the case antecedents that best match the contextual antecedents is then selected and the case consequents of the selected case are displayed to a user. The user then provides feedback regarding the displayed case consequents. The feedback may be integrated into the contextual antecedent for a new search of the case base. The method is computer-implementable and may be efficiently performed by a distributed processing system.

18 Claims, 7 Drawing Sheets

ADAPTIVE CASE-BASED REASONING SYSTEM USING DYNAMIC METHOD FOR KNOWLEDGE ACQUISITION

FEDERALLY SPONSORED RESEARCH AND DEVELOPMENT

The Adaptive Case-Based Reasoning System Using Dynamic Method for Knowledge Acquisition is assigned to the United States Government and is available for licensing for commercial purposes. Licensing and technical inquiries may be directed to the Office of Research and Technical Applications, Space and Naval Warfare Systems Center, Pacific, Code 2112, San Diego, Calif., 92152; voice (619) 553-2778; email ssc_pac_T2@navy.mil. Reference Navy Case No. 100222.

BACKGROUND

Case-Based Reasoning (CBR) involves the recording of a block of situations, to be matched by the context, and producing the closest matching case, which in turn produces the consequent of choice. A strength of CBR is that, unlike the situation for expert systems, a knowledge engineer is not required. One of the major unsolved problems in CBR pertains to how to automatically adapt a retrieved case to not only match the current context, but to adapt its consequent to be a proper match as well. There is a clear need for an adaptive case-based reasoning system and method that addresses the above deficiency in the art.

DETAILED DESCRIPTION OF SOME EMBODIMENTS

The Adaptive Case-Based Reasoning System Using Dynamic Method for Knowledge Acquisition solves a major outstanding problem in case-based reasoning—how to automatically adapt retrieved cases. The system and method emulates the workings of the human cerebral cortex and its various areas of specialization. It respects symbolic reasoning, monus ponens, deduction, and induction, but does so on the basis of fuzzy matches (i.e., Computing with Words or CW), which are a field-effect phenomenon. A sentence, s, is said to be precisiated when it is converted into a sentential form, $s^*$, which can be computed with (i.e., is a subsequence of s). Co-intension is a qualitative measure of proximity of the semantics of s and $s^*$. The method described herein learns to increase co-intension, and thus is seen to be of ever-increasing utility over time.

The system and method are suitably applied to domains where an algorithm for the equivalent solution is not known, it is desired to be able to use natural language (NL) input, and erroneous solutions can be somewhat tolerated, identified, and rectified.

Moreover, the system and method produces a possibility of error along with a displayed case consequent, which can be squelched to determine when the system has a reasonable chance of producing a reasonable answer (or not). Next, the very pragmatic question arises as to what application domains can be properly addressed by the methodology discussed herein. Broadly speaking, any domain for which a trained human would be an asset and for which no existing case-based reasoning (CBR), expert system, or evolutionary program would be practical are meant to be covered by the methodology described herein. This methodology is designed to be quite scalable and with time and training can, in theory, approximate the complex decision-making capabilities of the human brain. Currently, the implementation of the method discussed herein can process up to 100 k cases on a high-end laptop.

Further, the methodology discussed herein is capable of super-linear learning. Super-linear learning occurs if an acquired corrective case can be or is properly matched by more than one distinct context. Produced consequents can initiate web searches, request further information from the user, be fused with other produced consequents, or invoke various procedure calls to produce the results of a complex query process. Networking allows queries to be routed to the proper machine(s) to enable of fusion of expertise for problem solving. It follows from the Incompleteness Theorem that no matter how strong the super-linear learning, there will be a potentially countably infinite number of cases for an arbitrary (i.e., non trivial) domain. This also serves to underscore the importance of representation and generalization towards minimizing the requisite number of cases.

Figure 1:
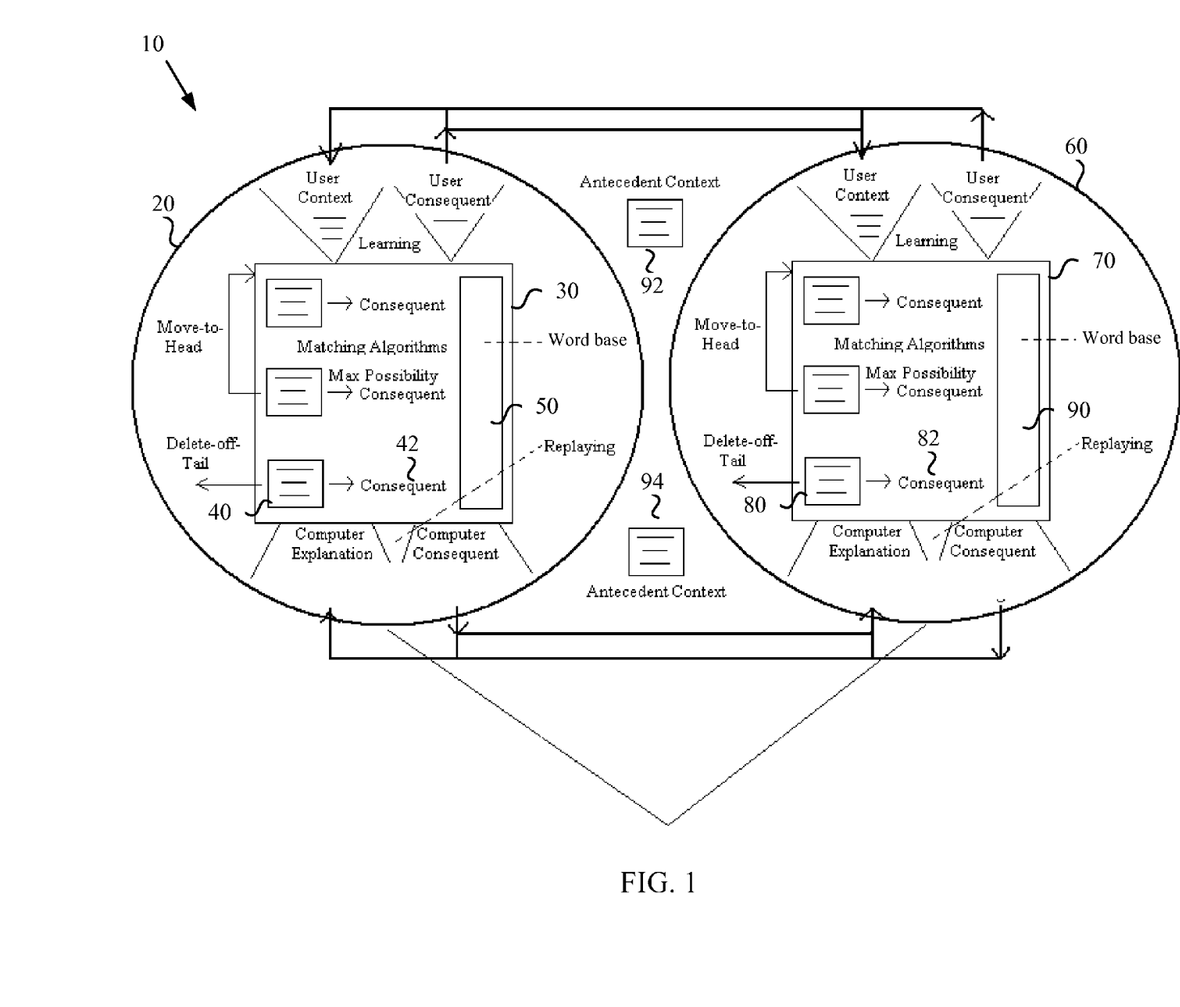
FIG. 1 shows a block diagram of the operation of one embodiment of a system in accordance with the Adaptive Case-Based Reasoning System Using Dynamic Method for Knowledge Acquisition.

FIG. 1 shows a block diagram of one embodiment of a system 10 in accordance with the Adaptive Case-Based Reasoning System Using Dynamic Method for Knowledge Acquisition. System 10 may include a first computing system 20 and a second computing system 60. System 10 is shown in a networked, multi-processor, distributed computing configuration. It should be recognized that system 10 may include substantially more networked computing systems 20 and 60 than those shown in FIG. 1. Additional computing systems allow for increased learning as system 10 scales upward.

Computing systems 20 and 60 may be substantially similar, and may be configured with the appropriate software modules to perform methods as discussed herein. The term "module" generally refers to a software module. A module may be implemented as a collection of routines and data structures that performs particular tasks or implements a particular abstract data type. Modules generally are composed of two parts. First, a software module may list the constants, data types, variables, and routines that may be accessed by other modules or routines. Second, a module may be configured as an implementation, which may be private (i.e., accessible only to the module), and which contains the source code that actually implements the routines or subroutines upon which the module is based. Thus, the use of the term "module" herein, indicates reference to such software modules or implementations thereof. The terms "module" and "software module" can be utilized interchangeably with one another to describe the same element or feature.

The Adaptive Case-Based Reasoning System Using Dynamic Method for Knowledge Acquisition described herein may be implemented as a series of modules, either functioning alone or in concert with physical electronic and computer hardware devices. Such modules may be utilized separately and/or together locally and/or remotely to form a program product thereof, that may be implemented through signal-bearing media, including transmission media and recordable media. The methods described herein may be implemented as a program product comprised of a plurality of such modules, which can be interactively displayed for a user on a display screen of a data-processing system (e.g., computer). Such interactivity may be provided by a specialized graphical user interface (not shown).

System 20 may include a case base system 30 including a plurality of cases having one or more antecedents 40 and one or more associated consequents 42. System 30 may further include a word base 50. The cases and word base 50 may be stored in memory within computing system 20. Similarly, system 60 may include a case base system 70 including a plurality of cases having one or more antecedents 80 and one or more associated consequents 82. System 70 may further include a word base 90. The cases and word base 90 may be stored in memory within computing system 70.

In operation, user-supplied contexts are input into case base systems 20 and/or 60. The user-supplied contexts may comprise one or more contextual antecedents, such as contextual antecedents 92 and 94, which are compared to the one or more case antecedents, such as 40 or 80, that are stored in the case base. The contextual antecedents may be stored as integers in the case base system, using the word base to aid in the word-to-integer conversion. This conversion is done to save space and increase the efficiency of the various pattern matchers embodied in this disclosure. The cases stored in the case base include case antecedents and case consequents, both of which are previously supplied by a user, either during training of the system or during real-time system operation. A case involving the best match of the case antecedents with the contextual antecedents is then chosen. The consequent of the selected case is then displayed to a user, and, if the displayed consequent is not a question, the selected case is moved to the head of the case base, as indicated in FIG. 1. In the event memory constraints occur, least-frequently-used cases are deleted from the tail of the case base, as indicated (or moved to a backup secondary memory device such as an optical jukebox). In some embodiments, in a training mode, the system may display, in addition to the case consequent(s) an explanation of the case antecedent(s) that were matched with the contextual antecedent(s) supplied by the user.

Some general rules that may be implemented into the system and method disclosed herein may include: 1) cases may be learned if the user agrees with the consequent or not—so long as they do not duplicate an existing case, in which case the existing case is simply moved to the head of the queue; 2) cases are moved to the head of the queue so that the most-recently referenced case will break any ties among cases having the same computed possibility and so that the least-recently referenced cases will fall to the tail where they may be expunged with minimal functional loss; 3) consequents that ask a question however are not moved to the head because they are not as valuable as regular cases when (if) case memory fills up; and 4) consequents may be specified as "unknown" for consideration for subsequent specification (or not), when they may become known.

Figure 2:
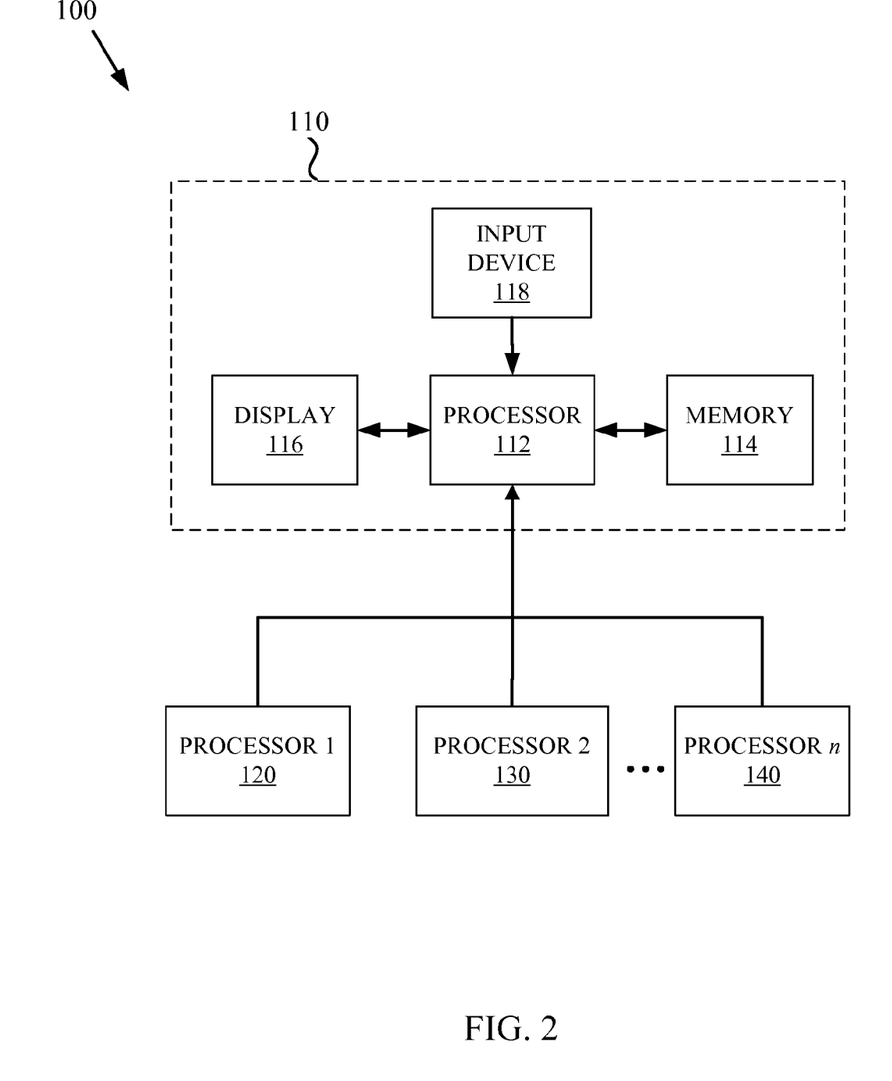
FIG. 2 shows a block diagram of an embodiment of a distributed processor system in accordance with the Adaptive Case-Based Reasoning System Using Dynamic Method for Knowledge Acquisition.

FIG. 2 shows a block diagram of an embodiment of a distributed processor system 100 in accordance with the Adaptive Case-Based Reasoning System Using Dynamic Method for Knowledge Acquisition. The speed of a case-based reasoning system can be increased through the use of associative memory and/or parallel (distributed) processors, such as shown in FIG. 2. Furthermore, an increase in speed can be obtained if information stores are subdivided for the case knowledge by domain for threaded parallel processing. This is known as segmenting the domain. Such segmentation can be automatically managed by inferred symbolic heuristics, but this will necessarily introduce much redundancy into the system—albeit brain-like. The idea here is to match the candidate case to be acquired against the dynamic case residing at the head of each segment. This case is acquired by those segments, whose head most-closely (not perfectly) matches it based on their possibilities.

Moreover, it is acquired by all segments whose current head is within $\delta$ of this new case, where $\delta$ is dynamically defined by the minimal possibility differential among case-base heads. However, whenever the computed possibility between the new case and the case-base heads is greater than the current maximum among case-base heads, $\delta$, so that the new case falls outside of existing segments, the case is acquired by creating a new segment (i.e., given sufficient parallel nodes/space)—otherwise, the least-recently—used (LRU) segment is expunged and replaced. Thus, a system, such as system 10 or 100, may be cold-started with a pair of non-redundant segments.

Further, given a system such as system 100, it is possible for one or more computers to chat back and forth with each other if the output of each can serve to augment the input for another. This process is also brain-like because here the cases will acquire knowledge on how to solve a problem (e.g., by way of asking questions)—not just domain-specific knowledge. This respects the mathematical process of randomization. Every consequent (or response to a consequent) may be either terminal or non-monotonic in its action—as determined by whether or not it elicits additional knowledge from the user (or other subsystem) to augment the on-going context. The consequent(s) produced by this iterative feedback process may be corrected, as necessary. This is knowledge amplification because knowledge begets knowledge. That is, knowledge imbued along one path of reasoning becomes subsumed along other paths of reasoning.

The word matching algorithm discussed herein, must visit the unknown cases too, or they will never be corrected. Feedback plays an important role in the operation of this methodology. Feedback takes two forms: 1) consequents may raise questions, the answers to which, supplied by the users, server to augment the context, and 2) the consequents themselves may literally augment the context—again, under user control. The fact that antecedents and consequents can share the same space implies that words for both share the same words table.

Classical set theory does not allow for duplication of elements in the context or antecedent. However, sentential forms are sequence sensitive and thus differ from sets. For example, if I state, "location", you might think of a map; but, if I state, "location, location, location", you might instead think of real estate. Our system must be capable of making use of such sequence in matters of practical feedback. However, contextual duplicate words may not be counted because to do so would proportionately decrease the resultant possibility and thus result in a bad case match. Fortunately, not counting duplicates does not change the complexity of the algorithm. The context length is decreased by one for each such duplicate (i.e., when in default mode). Then, notice that traditionally deleterious cycles (e.g., a→a; a→b, b→a; etc.) become an asset because with the aforementioned feedback comes duplication in the context, which as we've witnessed can beneficially alter sentential semantics. This means that there is no need to hash to detect cycles (using stacked contexts) because such cycles are beneficial. Finally, the allowance for cycles implies that there is no need to copy the context into a buffer to facilitate data entry. Besides, it really won't make it any easier to enter data.

As such, system 100 may include a computer 110 having processors 120, 130, and 140 connected thereto. Computer 110 may include a processor 112, memory 114, display 116, and input device 118, such as a keyboard or mouse. System 100 may be used to provide an increase in computing capacity by allowing processor 112 to coordinate processors 120, 130, and 140 such that maximum processing capabilities are achieved.

Figure 3:
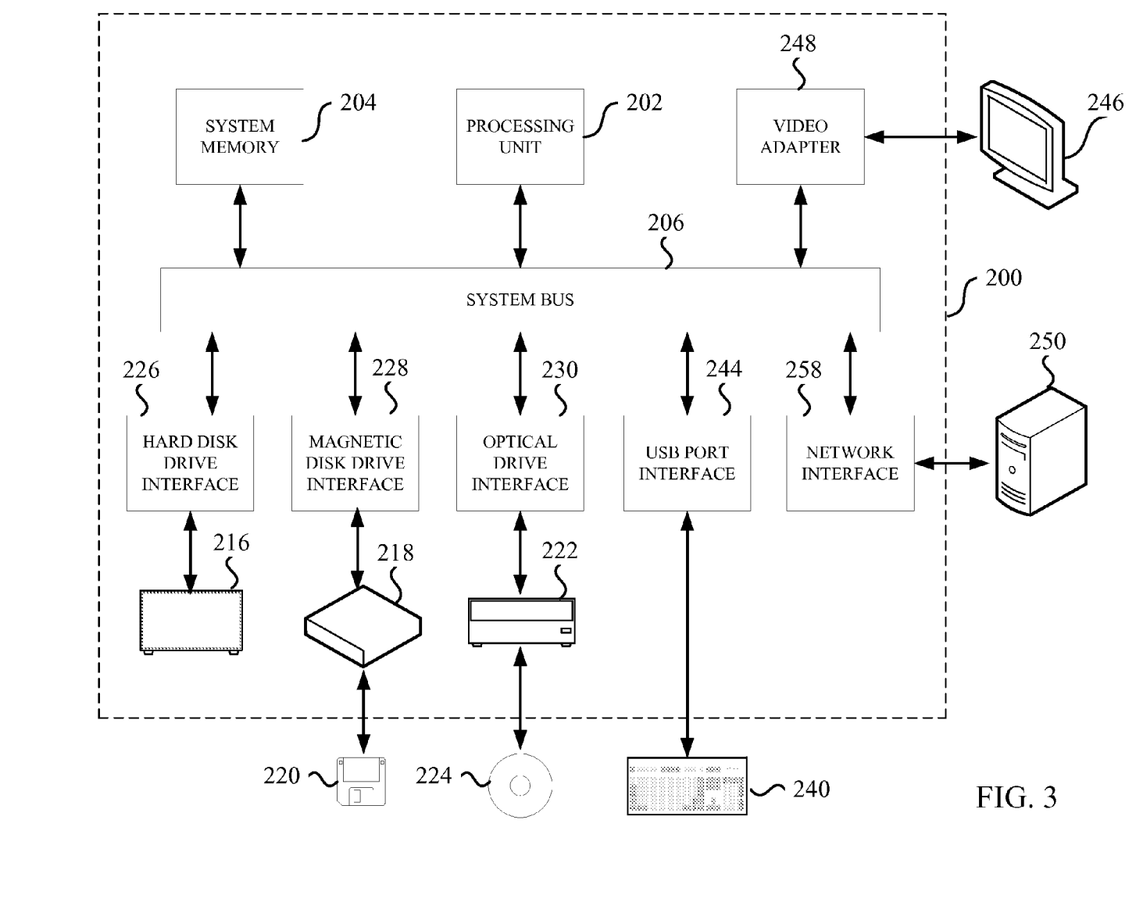
FIG. 3 shows a block diagram of an embodiment of a computing system for implementing and performing a method in accordance with the Adaptive Case-Based Reasoning System Using Dynamic Method for Knowledge Acquisition.

FIG. 3 shows a block diagram of an embodiment of a computing system that may be used to implement a method in accordance with the Adaptive Case-Based Reasoning System Using Dynamic Method for Knowledge Acquisition. FIG. 3 and the following description are intended to provide a brief, general description of a suitable computing environment in which an embodiment of the method discussed herein may be implemented. Although not required, the method will be described in the general context of computer-executable instructions, such as program modules, being executed by a personal computer.

Moreover, those skilled in the art will appreciate that embodiments of the method may be practiced with other computer system configurations, including hand-held devices, multiprocessor systems, microprocessor-based or programmable consumer electronics, networked personal computers, minicomputers, mainframe computers, and the like. Embodiments of the method may also be practiced in distributed computing environments where tasks are performed by remote processing devices that are linked through a communications network (such as shown in FIG. 2). In a distributed computing environment, program modules may be located on both local and remote memory storage devices.

System 200 may include a general-purpose computing device in the form of a conventional personal computer 200, which includes processing unit 202, system memory 204, and system bus 206 that operatively couple various system components to other system components (e.g., system bus 206 operatively couples system memory 204 to processing unit 202). Examples of system bus 206 include a memory bus, memory bus controller, peripheral bus and local bus using any of a variety of known bus structures. System memory 204 may include read only memory, random access memory, and basic input/output system.

System 200 further includes hard disk drive 216 for reading from and writing to a hard disk (not shown) a magnetic disk drive 218 for reading from or writing to a removable magnetic disk 220 (e.g., 4.5-inch disk), and an optical disk drive 222 for reading from and writing to a removable optical disk 224 (e.g., CD-ROM and DVD). Hard disk drive 216, magnetic disk drive 218 and optical disk drive 222 are operatively connected to system bus 206 via hard disk drive interface 226, magnetic disk drive interface 228 and optical drive interface 230, respectively. The drives and their associated computer-readable media provide non-volatile storage of computer readable instructions, information structures, program modules and other information for personal computer 200.

The method steps of embodiments may be stored on a hard disk, magnetic disk 220, and optical disk 224. Although the exemplary environment described herein employs a hard disk, magnetic disk 220 and optical disk 224, it should be appreciated by those skilled in the art that other types of computer readable media that may store information accessible by a computer, (e.g., magnetic cassettes, flash memory cards, digital video disks, Bernoulli cartridges, random access memories (RAMs), and read only memories (ROMs)) may also be used in the exemplary operating environment without departing from the scope or spirit of embodiments of the method.

A user may enter commands and information into personal computer 200 via input devices such as keyboard 240 and pointing devices (e.g., mouse and trackball) (not shown in FIG. 3). Examples of input devices include a microphone, joystick, game pad, and satellite dish. Input devices may be operatively connected to processing unit 202 via universal serial bus (USB) port interface 244 that is operatively connected to system bus 206. Input devices may also be operatively connected to processing unit 202 via other interfaces (e.g., parallel port, serial port and game port) that are operatively connected to system bus 206. Monitor 246 is operatively connected to system bus 206 via video adapter 248.

Other peripheral devices (e.g., speakers and printers) may be operatively connected to system 200 via other interfaces. System 200 may operate in a networked environment using logical connections to one or more remote computers such as remote computer 250 via network a network, such as a local area network, wide area network, and wireless network. Examples of remote computer 250 include a personal computer, server, router, networked personal computer, peer device, and network node.

Figure 4:
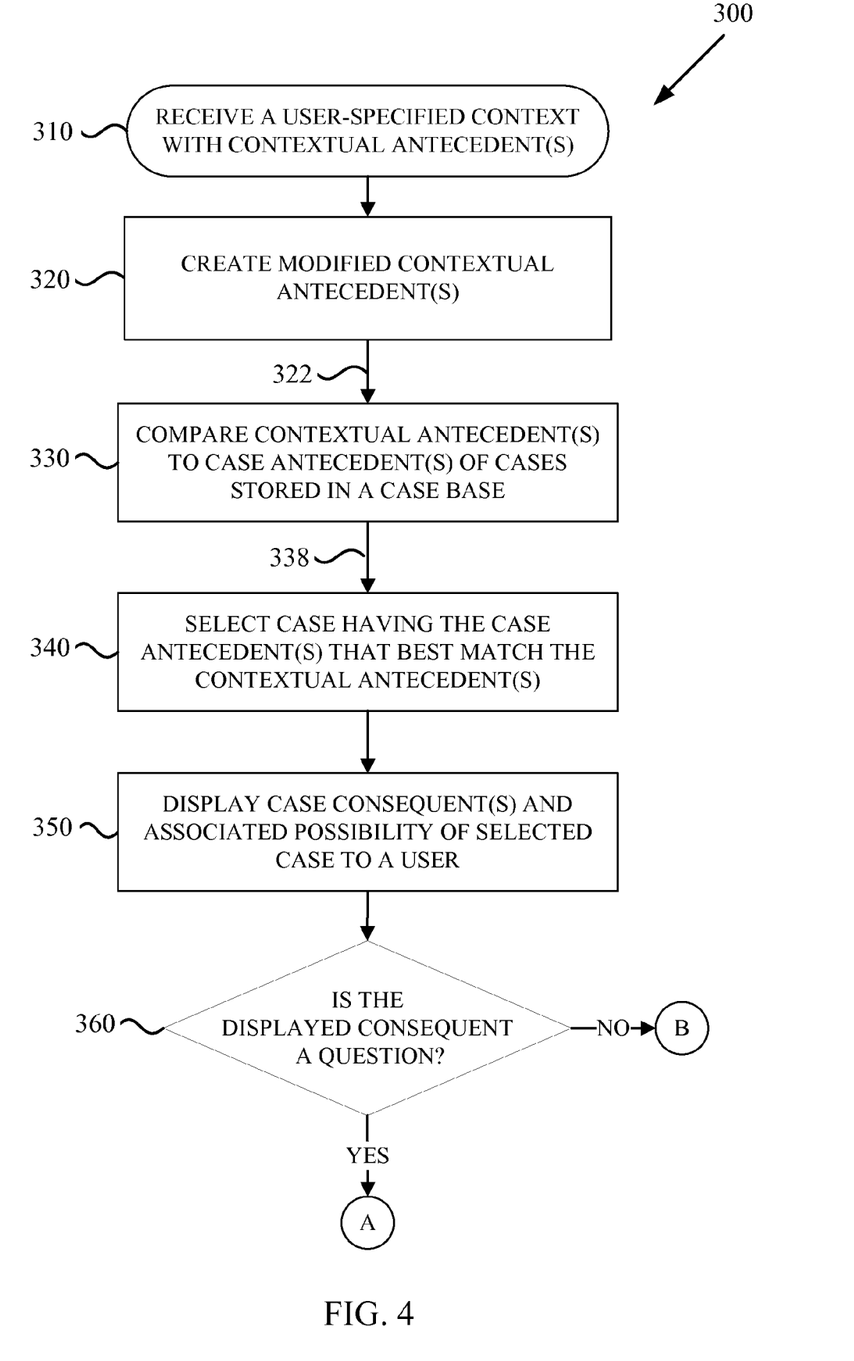
FIGS. 4-6 show flowcharts of an embodiment of a method in accordance with the Adaptive Case-Based Reasoning System Using Dynamic Method for Knowledge Acquisition.
Figure 5:
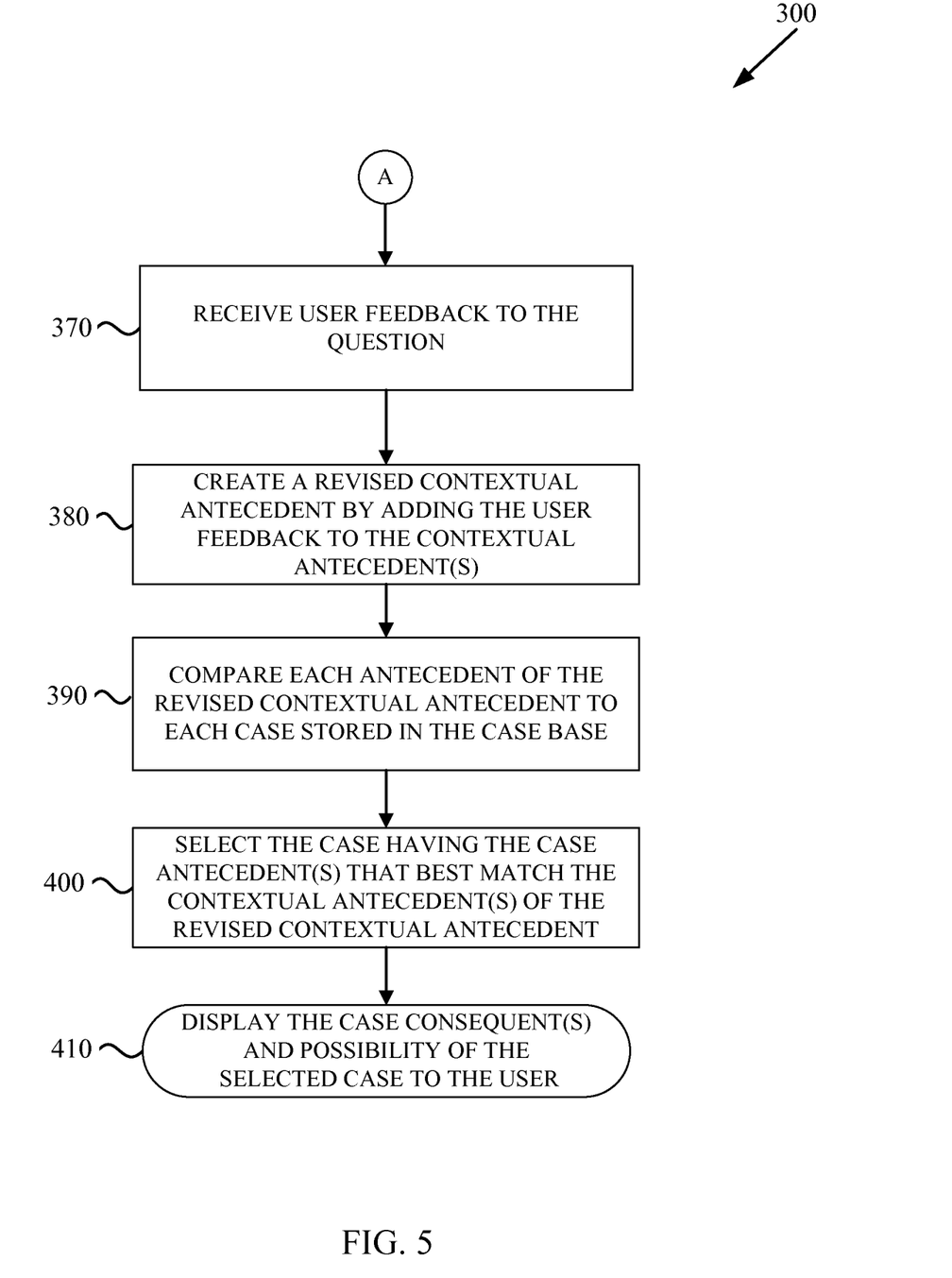
Figure 6:
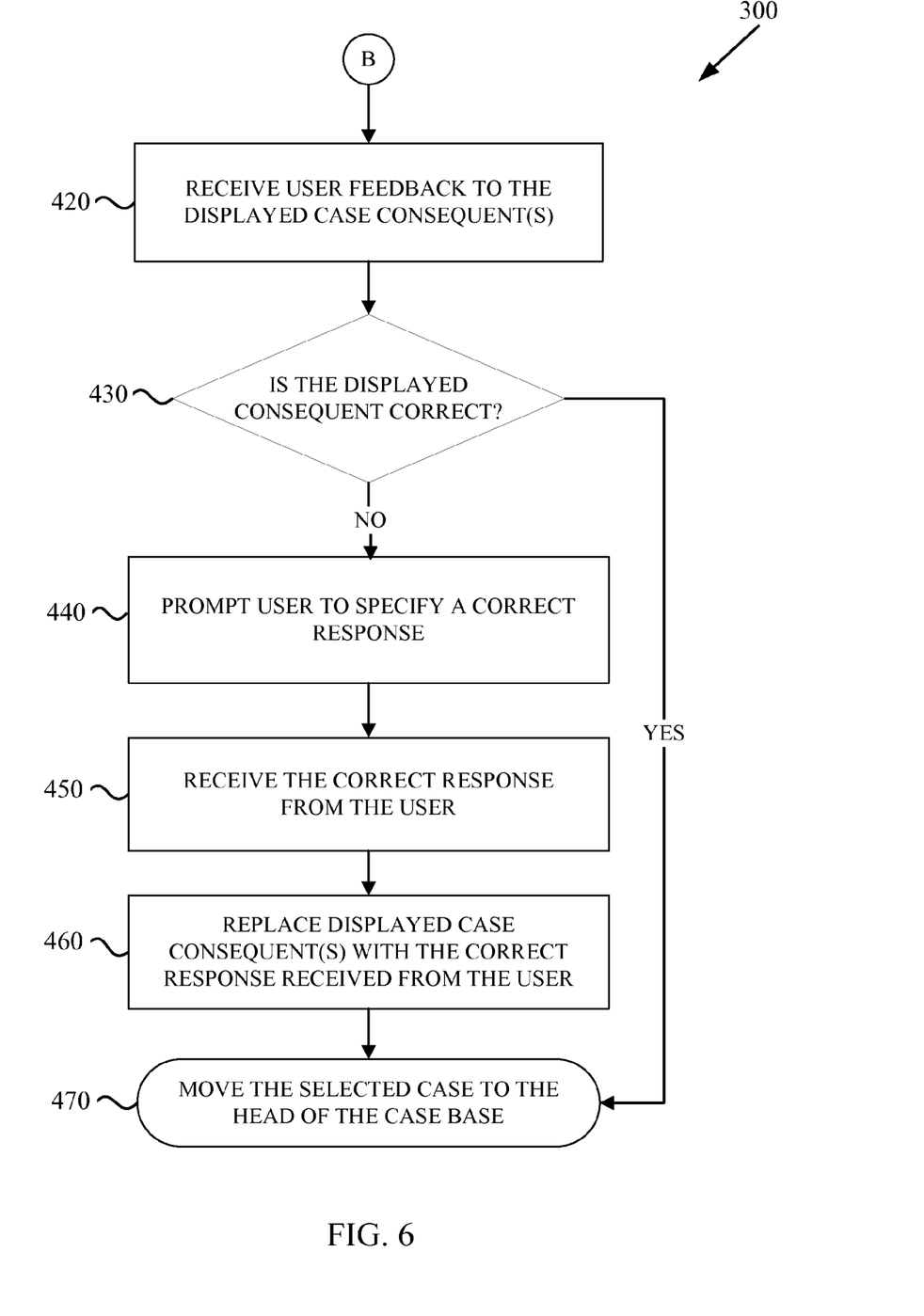

FIGS. 4-6 show flowcharts of an embodiment of a method 300 in accordance with the Adaptive Case-Based Reasoning System Using Dynamic Method for Knowledge Acquisition. Some or all of the steps of method 300 may be performed by a computer having a processing device connected thereto, such as computer 200 shown in FIG. 3 or system 100 shown in FIG. 2.

Referring to FIG. 4, method 300 may begin at step 310, which involves receiving a user-specified context comprising one or more natural language contextual antecedents. The natural language contextual antecedents may comprise words, numbers, or any combination thereof. The contextual antecedents may be single words, phrases, sentences, or multiple phrases or sentences. Further, the natural language contextual antecedents may be in any language identifiable by a user, such as English, Spanish, French, or Chinese. As an example, the user-specified context may be input by a user from a computer input device, such as keyboard 240.

In some embodiments of method 300, prior to step 310, a user may type in a context and may then be prompted by the system to specify a consequent. A user may desire to specify a consequent if the user wants to train the system to respond in a certain way to the user-specified context. If the user does not want to specify a consequent, the user may input that a search of the case base is desired, wherein the system may proceed with step 310 to receive the context and perform the steps as discussed below.

Following step 310, method 300 may proceed to step 320, which involves, for each contextual antecedent, creating a modified contextual antecedent by converting each contextual antecedent to a sequence of integers. In some embodiments; step 320 involves using a word base and performing a bisection search of the word base. As an example, step 320 may be performed by processor 202 using a word base stored in memory 204 of computer 200. The word base may include a listing of distinct words and distinct integers associated with the words. Method 300 then continues, via flow path 322, to step 330, which involves comparing each modified contextual antecedent to each of a plurality of cases stored in a case base. For example, step 320 may be performed by processor 202 using a word base stored in memory 204.

Each case in the case base may include one or more case antecedents and one or more case consequents. The case antecedents and case consequents may be stored in the case base as sequences of integers representing the respective case antecedents and case consequents. Step 330 will be discussed in more detail with respect to FIG. 7. Following step 330, method 300 continues, via flow path 338, to step 340. Step 340 involves selecting the case having the case antecedents that best match the contextual antecedents. Step 350 then involves displaying the case consequents of the selected case to a user.

In some embodiments of method 300, following step 350, step 360 involves determining whether the displayed consequent is a question. If so, method 300 proceeds to step 370 (see FIG. 5). Step 370 involves receiving feedback from the user regarding the displayed question. Step 380 may then involve adding the received user feedback to the contextual antecedents to create a revised contextual antecedent. Next, step 390 involves comparing each antecedent of the revised contextual antecedent to each of the cases stored in the case base. Step 400 then involves selecting the case having the case antecedents that best match the contextual antecedents. Method 300 may then proceed to step 410, which involves displaying the case consequents of the selected case to the user. Following step 410, flow may return to step 310.

Referring back to step 360, if the displayed consequent is not a question, method 300 may proceed to step 420 (see FIG. 6), which involves receiving user feedback to the displayed case consequent(s). Step 430 may then involve a user determining whether the displayed consequent is correct. If the displayed consequent is not correct, step 440 involves prompting the user to specify a correct response. In some embodiments of method 300, step 440 involves prompting a user to specify either a correct response or that the response is "unknown." If the user inputs that the response is "unknown," the system may, prior to step 310, prompt the user to provide correct responses to the cases having consequents identified as being "unknown." In such event, the system may prompt the user to identify responses for the cases involving the most-recently designated "unknown" consequents. The user may have the option not to provide a response, and may have the option to delete the cases involving unknown consequents.

Method 300 may then proceed to step 450, which involves receiving a correct response from the user. Next, step 460 involves replacing the displayed consequent of the selected case with the correct response from the user. Method 300 may then proceed to step 470, which involves moving the selected case to the head of the case base. Following step 470, flow may return to step 310. In embodiments where unknown responses are provided for, flow may return to the step for prompting a user to provide correct responses to the cases having consequents identified as being "unknown."

Figure 7:
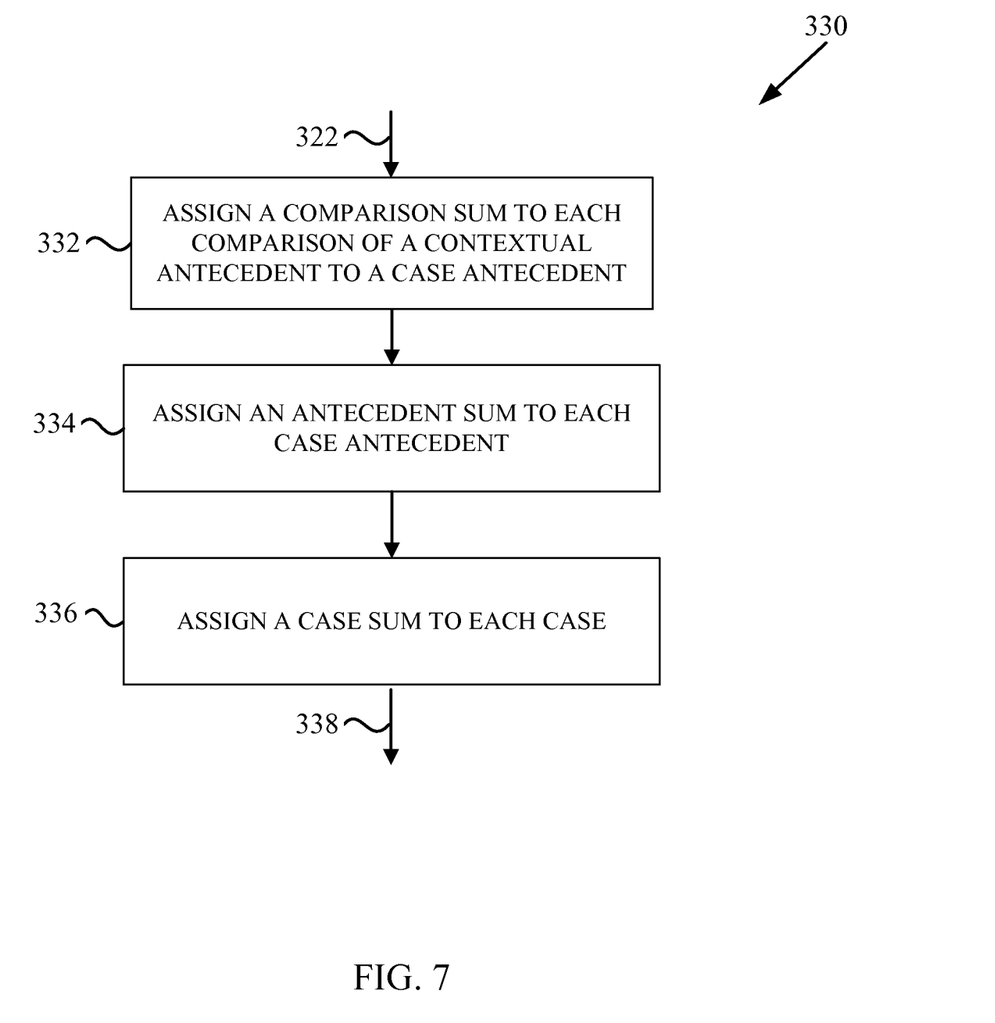
FIG. 7 shows a flowchart of an embodiment of a comparison step of the method shown in FIG. 4-6.

FIG. 7 shows a flowchart of an embodiment of a step 330 of method 300. Step 330 may begin at step 332, which involves assigning a comparison sum to each comparison of a contextual antecedent to a case antecedent. The comparison sum is, simply speaking, equal to the number of sequentially matching words (allowing for intervening words) between the contextual antecedent and the case antecedent. For example, consider the following contextual antecedents (A) and case antecedents (C):

S1, A="The", C="The", sum=1
S2, A="The", C="boy", sum=0
S3, A="The girl", C="The", sum=1
S4, A="The girl", C="girl", sum=1
S5, A="The boy", C="The boy", sum=2
S6, A="This is a quite good test", C="That was a very good test this", sum=3
S7, A="This is a quite good test", C="This was a very good test this", sum=4
S8, A="went to school to study", C="went into theology to study", sum=3

These examples are supported by the following algorithm. Let, A[i] be the ith word (integer) in the antecedent context and let C[j] be the jth word (integer) in the case antecedent, where the dynamic length arrays have first index at zero. D is a predicate defined by its index. The following algorithm will find the length of the longest embedded subsequence here.

```
r = |A[i]|; // length of the A sentence, which is defined to be zero if
one element (Java)
t = |C[j]|; // length of the C sentence, which is defined to be zero if
one element (Java)
sum, tab = 0;
i = antecedentstart[last row] + 1;
do {
    count = 0;
    j = antecedentstart[row] + 1;
    temp = j;
    do {
        increment = false;
        while ((j <= t) && (A[i] != C[j]))
            j++;
        if (A[i] == C[j])
        {
            count++;
            // don't count duplicates:
            k = i;
            do
                i--;
            while ((A[i] != D[k]) && (A[i] != -1) && (A[i] != -3));
            if (A[i] == D[k]) // duplicate
            {
                count--;
                contextlength--; // by default, don't count duplicates
                // using contextlength--, if a; a a; and a a a; are known
                // a a a a; will map to a a not a a a except where learned
                // otherwise, contextlength-- gives more accurate possibility
                i = k;
            }
            else // never seen before
            {
                i = k +1;
                j++;
                tab = j;
                increment = true;
            }
        }
        if (i > r)
            break; // exit loop and compute sum
        if (! increment)
            i++;
        if (tab > t)
            break; // exit loop and compute sum
        j = temp;
    }while
        (i <= r); // must be <= not <
    // sum will hold the longest embedded subsequence here:
    sum = max (count, sum);
} while
(i <= r);
```

Step 334 may then involve assigning an antecedent sum to each case antecedent. The antecedent sum is equal to the comparison sum divided by the higher of the number of words in the contextual antecedent and the case antecedent. Step 336 may then involve assigning a case sum to each case. The case sum may be determined by summing each antecedent sum for the particular case and dividing by the number of antecedents in that particular case. It should be noted that the case sum will always be a value between 0 and 1. If two or more cases have the same case sum, the method may select either the most-recently used case or the most-recently acquired case. Following step 336, method 300 would continue to step 340, which may then select the highest case sum. Next, at step 350, the consequents associated with the antecedents of case 1 would be displayed to the user for feedback.

Some or all of the steps of method 300 may be stored on a computer readable storage medium, wherein the steps are represented by computer readable programming code. The steps of method 300 may also be computer-implemented using a programmable device, such as a computer-based system. Method 300 may comprise instructions that, when loaded into a computer-based system, cause the system to execute the steps of method 300. Method 300 may be implemented using various programming languages, such as "Java", "C". or "C++".

Various storage media, such as magnetic computer disks, optical disks, and electronic memories, as well as computer readable media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

The Adaptive Case-Based Reasoning System Using Dynamic Method for Knowledge Acquisition may be differentiated from related technologies in that it is a true cognitive emulator, which brings with it all of the advantages of keeping the human in the loop—yet, it remains automated and scalable. A non-exclusive list of relevant application areas for the Adaptive Case-Based Reasoning System Using Dynamic Method for Knowledge Acquisition includes:

Non-linear (NL) chess or other simulation games (e.g., various warfighter simulations that require either advice or instructions from the user(s) in the course of play);

In training and tutoring applications, it enables the student to engage the system using conversational learning—enabling a more lifelike/realistic approach;

In (multiple) fault diagnosis, it enables the technician to state the problem using NL and pursue a candidate solution(s) merely by responding in English to the computer's questions, which are assimilated by the context;

Square case antecedents can symbolically describe images and/or acoustic signatures (or differentials thereof)—allowing the methodology to learn to recognize images that are categorically similar (e.g., a chair and a rock capable of serving as a chair);

In the performance of link analysis, the system and method can enable descriptive characterization of the subject, his/her links, and the objects being pursued;

Consequents can define Internet queries so as to access a large database for desired information;

In the mixing of metals to form alloys, properties can be described using NL and the mixture will be the consequent;

In deciding upon medical procedures, NL can be used to describe a patient and the entire base of medical knowledge can be automatically scoured to find the best procedure for this particular patient—all things considered;

In the area of Knowledge Management (KM), help desks can be constructed that take input and provide output in NL. Moreover, the concept here is to link everyone's PC over a threaded network. Everyone is a consumer and most are producers of knowledge. A system can be devised whereby anyone can ask it a question using NL and are requested to train the system in their area of expertise by way of automated email. The trainer's name is made available to the user by way of a single mouse click. This helps to insure system validity. Over time, the system will learn to become of increasing utility;

In rational drug design, the biological constraints (e.g., tertiary and quaternary structures) can be input to the algorithm using natural or pseudo-natural language and the relaxation of those constraints can be output;

In the realm of invention and discovery, known constraints can be input in NL and the use of problem reduction allows for the induction of creative consequents. By feeding successful designs back into the system, creativity is essentially learned. Such creative design can be applied to everything from battery to schematic design; where the schematics are mapped onto consequents as software components.

Further, the original user-specified context query syntax input needs to be stored for each antecedent for each case. Contextual antecedents are delimited by a period space, or a period return. Matching involves minimizing the syntax in each antecedent to be matched such that it may only be mapped onto by a similar semantics (i.e., high cointension). All antecedents that embed a subsequence of the context, or that are covered by the context, may be flagged for use in processing (with a matched count) as per above. This entails visiting them one by one and making such determination. Case constituent antecedents are mapped to contextual antecedents so as to maximize the overall case sum. The case having the highest possibility is selected as the winner. Otherwise, the case logically closest to the head (in the segment having the highest possibility) is selected as the winner in the event of a tie. The capability for qualitatively fuzzy coverings defines a principle component of CW and serves to make the inference engine unique and general.

Additionally, numbers are treated like words (e.g., −3.14 is not the same as 3.14, which does not match 3.15). The problem to be addressed here pertains to how to save only those numbers that are deemed to be significant. Consequent numbers are always stored in the consequent hash table because consequents may directly or indirectly (i.e., by way of query) augment contexts (i.e., non-monotonic feedback) and thus must be considered to be one and the same.

One solution involves advising the user to only use exact numbers or times if they tend to be reused. For example, the use of 12:00 is acceptable, but 3:17 is probably not. The system also does not expunge a predicate once stored in the word table. Alternatively, if a number is not found in the antecedent hash table, then a circular memory is checked (i.e., one that begins to overwrite itself, at the bottom using a circulating pointer, say every 365 elements). The exact number of elements is somewhat domain dependent. If it is not found in the circular memory, then it is added at the top of this memory. Otherwise, it may be presumed that there is some significance to this number (e.g., 32° F.). Thus, it is written to the word table and both occurrences are replaced in circular memory with a zero. Array-based pointers are adjusted so that the last item on this list becomes the newly formed pair of zeros. This is implemented using a bisection algorithm in lieu of hashing because the increase in search time represented by logarithmic bisection is less than the linear time of case matching and thus will not increase the order of magnitude of the realized algorithm, while being more conservative of RAM than is hashing.

This implementation allows for the saving of unknown consequents for any supplied case. It allows the user to retrieve unknown consequents in the order most-recently saved first. The user may also specify a context that has a best match in that context paired with an unknown. This option may or may not be enabled because unless enabled, there might otherwise be no way to correct a best case match, while unless disabled, there would be no way to find the best matching case that the system currently knows. The user is given an option to expunge all cases having unknown consequents or to expunge them after visiting them in last-in-first-out (LIFO) order.

Sequence is critical in matching sentential forms. For example, consider the following pair of sentential forms, which have the exact same set memberships, but entirely distinct semantics. Consider, "The dog bit the man" vs. "The man bit the dog". The latter most often occurs in the context of a baseball game. As another example of the role of sequence, the context, "This is a quite good test." and the antecedent (or vice versa), "That was a very good test this." match on the words, "a good test", yielding a sum of three—the longest embedded subsequence here. See parameterization below for an additional example.

In some embodiments of the system and method, word clauses may be combinatorically ordered so as to achieve a best match against each case block. Each of m antecedent rows of a case are evaluated for each of n contextual columns. Thus, each antecedent row is tagged with n contextual sums—each of which is paired with the contextual column from which it came. For example, using m=3 and n=4, we might have, where the nth number is otherwise implicit:

Row 1: (5, 1) (7, 2) (4, 3) (2, 4)
Row 2: (3, 1) (7, 2) (3, 3) (3, 4)
Row 3: (4, 1) (5, 2) (6, 3) (4, 4)

Note that it is not required that n≧m for a proper match of the case antecedents. This follows because more than one case antecedent statement can be covered by a single contextual statement. Here, the first number in the depicted ordered pairings is the contextual sum associated for that row, where the second number of the ordered pair, where used, gives the contextual sentential number. The task is to most rapidly find that assignment of contextual sums, which maximizes the overall case sum. For instance, notice that if we assign 7 to Row 1, we need to assign a 3 to Row 2 for a total of 10 for these two rows; whereas, if we assign a 5 to Row 1, we can assign a 7 to Row 2 for a better total of 12 for these two rows. Ideally, one would iteratively select one row and assign the maximum to that row, then select a remaining row and assign the maximum of the remaining integers to that row to arrive at a sum. The maximal such sum will be found after m! assignments. Clearly, this is NP-hard and a heuristic solution is thus usually needed.

One solution is to select a heuristic limit of 2, 3, 4, or even 5 (since 5!=120) maximums at most to compare at each iteration. Having more processors, and a segmented base (see below), vie for slightly deeper heuristic searches. Here, we will take a heuristic limit of 2 to illustrate the method. Thus, we first find those two rows having a maximal value for the n ordered pairs across all m rows. Here, that would be rows 1 and 2. In the event of a tie, the highest rows are to be favored, since they tend to reflect what is most important to the user. First, we assign row 1 a sum of 7. Then, we delete the row and column it appears in and find the next 2−1=1 row having a maximal value for the n ordered pairs across all m rows, which would be row 3. Thus, the first assignment has a sum of 7+3+6=16. Next, we assign row 2 a sum of 7 and proceed as before. This leaves rows 3 and 1. Thus, the second assignment has a sum of 5+7+6=18, which becomes the case sum for comparison against other case sums.

A far more efficient heuristic may be computed by noticing that for any row, we want to select that maximal contextual sum such that the remaining n−1 rows are likewise maximized. Thus, in the example above, if we assign 5 to row 1, we neither cross-off the maximal number for any remaining row, nor does sacrificing the maximal value of 7 for row 1 preclude its use for row 2. In general, for rows 1 to m and for columns 1 to n, tentatively select a sum [i, j] and iteratively cross off its row and column and compute the remaining sum by adding together the max for each column for each remaining row. Assign a row that maximal sum [i, j], which results in a maximal sum for the entire matrix, inclusive. Ties in assignment are resolved arbitrarily using the uniform Mersenne Twister algorithm. This heuristic process is O (mn), which is superior to the factorial method presented above for a heuristic limit of at least 4. The optimal process here would be O (n·n−1·n−2 . . . m terms) because results might vary with the iterative starting point. Thus, this is the preferred heuristic methodology.

A possibility metric is used to rank order the cases. The possibility associated with the consequent may be computed as follows. The greater the possibility, the less is the chance of error. Furthermore, the case having the highest possibility with the presented context is said to be fuzzily matched whenever an exact (i.e., crispy) sequence-sensitive match cannot be had. Consider the two antecedent case statements, (a b) and (a x) and the three contextual statements (a), (b), and (a b). Then, the possibility that this matched case yields a correct result may be computed using the formula, $$possibility(case_k) = \frac{1}{m}\sum_{i=1}^{m} \frac{sum_i \mid sum_i \geq sum_j, j = 1, 2, \ldots, n}{\max(|contextual\ antecedent_j|, |case\ antecedent_i|)} \quad (1)$$

where, there are m antecedent case statements and n contextual antecedent statements and the ith case antecedent attains its maximal value, $sum_i$, when paired with the jth contextual antecedent. Here, 0.0 denotes perfect uncertainty and 1.0 denotes perfect certainty. It is not sufficient just to cover a case antecedent—one must also account for the exactness of such coverage. For example, the phrase, "He loves me not" would not properly cover the phrase, "He loves me". Search may be interrupted and the current consequent returned if ever a possibility of 1.0 is produced. Similarly, if 0.0 is the best possibility produced, then the system should return with, "I don't know".

An alternative method for computing the possibility for two vectors, $a = \langle a1, a2, \ldots, am \rangle$ and $b = \langle b1, b2, \ldots, bn \rangle$ is $\frac{1}{mn}\sum_{i=1}^{m}\sum_{j=1}^{n} a_i \odot b_i$, where the operator, $\odot$, is defined by $\frac{sum_{i,j}}{\max(|contextual\ antecedent_j|, |case\ antecedent_i|)}$, and the sum is defined as before (e.g., "It is cloudy outside" and "It is snowing" define a sum of 2 and an $a_i \odot b_j = 0.5$). Next, define these two vectors to be mutually random as the lowercase letters of the alphabet; where, the applicable case is <a b c d e f g h i j k l m n o p q r s t u v w x y z>→alphabet. The pair of vectors is said to be mutually random because (a) they have nothing in common if not an exact match and (b) the number of exact matches is minimal relative to the number of possible other matches. That is, $$a_i \odot b_j = \begin{cases} 1, & \text{if } a_i = b_j, \\ 0, & \text{otherwise,} \end{cases}$$

where (b) holds. Then, the possibility here is given by $$\frac{1}{mn}\sum_{i=1}^{m}\sum_{j=1}^{n} a_i \odot b_j = \frac{1}{26}.$$

By contrast, using the method of equation (1), a possibility of 1.0 is obtained. Neither method is dependent on the contextual sequence. More generally, as m and n grow without bounds, the computed possibility here tends towards zero, while using the method of equation (1), it remains at 1.0. It should be clear that the possibility of the alphabet case is far closer to unity than to zero and hence the superiority of the method of equation (1) is established.

This method has the advantage of not requiring that the two vectors be symmetric (as they are usually more random than symmetric as has just been demonstrated). As a further illustration, when I write, "the barometer is falling", "clouds are forming", "it's humid", and say "it's above freezing", then the context is virtually random and again this is the general case. Any attempt to combine the two methods would only serve to approximate the performance of the highest and lowest return(s) under either method alone, which while possible, cannot circumvent the fact that it is far more likely that the returns having the lowest possibilities are simply improper matches (i.e., as a consequence of the size of the search space).

Often, but not always, the system will raise the same question again and again. This is not to be interpreted as an error under the method of equation (1). Rather, the augmented context will simply need to be associated with a new consequent (not a query) for subsequent replay.

Cases are only moved to the head in the event of an exact (i.e., non fuzzy) match. The fuzzy derivation is of course placed at the head. The justification for not moving the source case (i.e., question-generator) to the head in a fuzzy match is (a) it may not be valid in the current context, (b) its most important antecedent predicates have already been captured by the fuzzy derivation(s), and (c) its marginal utility is vanishing.

Question-asking cases should only be visited after all other cases to minimize the need to ask unnecessary questions. It follows that it is proper for them to fall to the tail of the list. Thus, question-asking cases are not moved to the head when fired. (An empirical investigation showed that it was not practical to move fired questions to the head as well—suggesting that it might be theoretically incorrect to do so.) Instead, the cases (having augmented contexts), which do not ask questions, build up towards the head. These cases tend to cover for expunged question-asking cases and are of greater utility given limited available free space. Expunged cases may be saved to an optical jukebox, or equivalent for reuse, or be recreated if and when needed.

It may be thought that hashing to remove the most common words such as, "a", "the", et al. will result in a concentration of the most meaningful words. While generally true, the problem here is that it is impossible to say when a word(s) will be meaningful or not. For example, to a bounty hunter, "That's the man" means something entirely different from, "That's a man".

Notice that this method does not require keeping a hash table of the number of antecedents a word or phrase appears in within the base. Using a hash table, phrases such as, "Vitamin A" or "Old Town" are immutable and might be stored as such to prevent the loss of valuable information. Such information should be hashed or searched using bisection however inasmuch as it is faster to search and process integers than it is to search and process words—with or without respect for immutable objects.

It is possible that whenever the user agrees with a returned case consequent as being correct, the mapped antecedent can be stored as a synonym for use in parallel matching. There is however a danger of error creep here because while the case is correct the antecedent may still not be (i.e., at least lose shades of meaning). Thus, somewhat repetitious training may be acceptable in lieu—as is the case with humans. Multiple antecedent blocks may point to the same consequent and may be stored when not redundant—even when the system gets it correct, given sufficient memory (to create positive feedback, which may be delayed by way of queuing). The fired case antecedent will be produced upon request so that the user might better see what was matched.

The goal of parameterization is to synthesize dynamic responses through the parameterization of both case antecedents and their consequent. For example, consider the following sample case, where "R" stands for Row.
R1: went to *school* to study
R2: to become a *scientist*→Go for a good *school* to be a *research* *scientist*
R3: and work on a *research* career
In matching this case, anything between * * is a wildcard and will match one or more words. For example, the following partial context is a very close, but not perfect match for R1: went into theology to study.

Here, R1 has the three words, "went to study" in common. Thus, "into theology" would substitute for, "school". But then, the consequent would read, "Go for a good into theology to be a . . . ." This bad grammar can of course be remedied by feeding back the consequent to match a one-line antecedent, but then the advantage of parameterization is lost, since each such transformation is domain-specific. This is the case despite the potential for reuse because the number of grammatically bad sequences is not bounded above. Thus, in conclusion, parameterization is not practical and thus is not to be attempted. The exclusive use of simple cases will suffice.

Referenced declarative cases will be logically moved to the head of their containing list. This allows the LRU material to be readily identified for deletion, whenever memory is no longer available. One implementation appends at the head of the case base and allows users to manually or automatically delete from its tail whenever available memory becomes in shortage.

As an example, in some embodiments, method 300, as described herein, may include the following steps:

1. START
2. Initialize system. Read all variables from disk.
3. Repeat
4. Read words delimited by a space or a period or some other delimiters (e.g., "1", ",", ";", ":", or the special case of "?", etc).
5. A period space or period return delimits a contextual antecedent. Again, additional delimiters may be used.
6. If two successive returns, ask the user if he/she wishes to exit the system.
7. Replace case antecedent and consequent with hash or bisection table integers using one combined table. Hash or bisections tables are used to rapidly convert words or consequents to integers. It is most efficient of space and time to simply use an integer as an array index to convert it back again.
8. If a word (consequent) is not found in the appropriate hash or bisection table, add it—including the special word, u, for "UNKNOWN" (see below). Words (consequents) are never deleted from the word table.
9. Numbers are always stored in the hash (bisection) table. If a number is not found in the hash (bisection) table, then a circular memory is checked (i.e., one that begins to overwrite itself, at the bottom using a circulating pointer, say every 365 elements). If it is not found in the circular memory, then it is added at the head of this memory. Otherwise, it may be presumed that there is some significance to this number for the table domain (e.g., 32° F.). Thus, it is written to the hash (bisection) table and both occurrences are replaced in circular memory with a zero. Array-based pointers are adjusted so that the last item on this list becomes the newly formed pair of zeros. The circular memory is to be written out to and read in from secondary memory.
10. New or previously incorrect case consequents may be labeled as, "UNKNOWN". The user may visit such unknown cases in the order most-recently saved first (i.e., LIFO). They may also expunge all cases having unknown consequents or supply correct consequents on a case by case basis when known. In what follows, unknown cases may or may not be paired with supplied contexts in accordance with user preference.
11. Let, A[i] be the ith word (integer) in the antecedent context and let C[j] be the jth word (integer) in the case antecedent, where the dynamic length arrays have first index at zero. D is a predicate defined by its index. The algorithm displayed above will find the length of the longest embedded subsequence here.
12. Users may elect to augment the previous contextual antecedent, or start a new one: The output of one or more machines may be channeled back to augment the input to acquire problem-solving knowledge. The user either augments the context to effect this, or allows the system to cycle to the next context. The response(s) to question-generating consequent(s) may be fed back to augment the current context. Larger contexts present more opportunities for quality case antecedent covers.
13. Compute the longest subsequence for each case antecedent for each contextual antecedent.
14. Save results in a case antecedent matrix.
15. Use the following possibility metric to rank the cases in the event of a non-exact match. This metric will run over the range [0, 1], where the greater the metric, the better the match.
16. Compute the possibility for each case when its sum is computed, using the formula:

$$\frac{1}{m}\sum_{i=1}^{m}\frac{sum_i}{\max(|contextual\ antecedent_i|,\ |case\ antecedent_i|)}.$$

Search may be interrupted and the current consequent returned if ever a possibility of 1.0 is produced. Similarly, if 0.0 is the best possibility produced, then the system should return with the semantic equivalent of, "I don't know".
17. Cases are only moved to the head in the event of an exact (i.e., non fuzzy match). The fuzzy derivation is of course placed at the head.
18. The agenda mechanism for case selection is presented below in the following subroutine.
    a. Assume m statements in the case antecedent and n statements in the context with no constraints between the values of m and n.
    b. Rank each of n statements in the context for each of m statements in the current antecedent, assigning each antecedent statement the value of its maximal pairing. Note that the same contextual statement may be assigned to distinct antecedent statements. Ties are preferentially broken in favor of the most recent case on the machine computing the greatest possibility (i.e., using parallel, distributed processors).
    c. Repeat this process until all m statements in the case antecedent are covered and assign a metric to the case (as previously defined). The cases are visited in order of most-recently acquired first.
    d. Do this for all cases in the case base.
19. Find the best case match for the contextual paragraph. If the case base is segmented, select that base(s) whose head computes the maximal possibility, or is within δ of this value (see below). Resolve ties in favor of that case a) in the most recently created segment, which is b) logically closest to the head.
20. If the user (oracle) deems the presented case to be incorrect, traverse down the list of possibilities to the next case, unless squelched or otherwise directed. Note that in our implementation, the system is squelched after the first case consequent presentation. The user selects or enters a correct case consequent, as necessary.
21. If the user cannot provide immediate feedback, stack the case until such time, if ever, as feedback can be provided. Provide for the serial and/or complete deletion of cases having unknown consequents at the user's volition.
22. If the user asks for an explanation (by default) replay the selected case (directly converting integers back to words without the need for any form of search).
23. If the case base becomes full, delete the LRU case(s). (In other designs, the LRU case may be written to secondary memory and paged in when referenced.)
24. If a serial processor, move or enter the correct case (i.e., antecedent context→correct consequent) to/at the logical head of the case base if not redundant. If a duplicate, delete the lower copy. Otherwise, if threaded/distributed processing is used, do:

25. Compute the minimal possibility, δ, among case-base heads, whenever a case head changes. The case is acquired by those segments, whose head most-closely (not perfectly) matches it based on their possibilities. A perfect match (i.e., a possibility of 1.0) is not included because then it would be redundant. Moreover, it is acquired at the head of all segments whose current head is within δ of this new case, where δ is dynamically defined by the minimal possibility differential among case-base heads. However, whenever the computed possibility between the new case and the case-base heads is greater than the current maximum among case-base heads, Δ, so that the new case falls outside of existing segments, the case is acquired by creating a new segment (i.e., given sufficient parallel nodes/space)—otherwise, the LRU segment is expunged and replaced. If only one segment exists, then a second must follow.

26. Write all variables to disk if the exit command is received, or whenever the words table dictionary or case base is updated as a prelude to another query. Note that once a number is assigned to a word, it must not be changed or lost for the sake of consistency in the case base.

27. Until 28. forever

29. END.

Many modifications and variations of the Adaptive Case-Based Reasoning System Using Dynamic Method for Knowledge Acquisition are possible in light of the above description. Within the scope of the appended claims, the Adaptive Case-Based Reasoning System Using Dynamic Method for Knowledge Acquisition may be practiced otherwise than as specifically described. Further, the scope of the claims is not limited to the implementations and embodiments disclosed herein, but extends to other implementations and embodiments as may be contemplated by those having ordinary skill in the art.

I claim:

1. A computer-implemented method comprising the steps of:
    receiving a user-specified context comprising one or more natural language contextual antecedents;
    for each contextual antecedent, creating a modified contextual antecedent by performing a bisection search of a word base and converting each contextual antecedent to a sequence of integers using the word base;
    comparing each modified contextual antecedent to each of a plurality of cases stored in a case base, each case comprising one or more case antecedents and one or more case consequents, wherein the case antecedents and case consequents are stored in the case base as sequences of integers representing the respective case antecedents and case consequents;
    selecting the case having the case antecedents that best match the contextual antecedents;
    displaying the case consequents of the selected case to a user; and
    receiving feedback from the user regarding the displayed case consequents.

2. The computer-implemented method of claim 1, wherein the step of comparing each modified contextual antecedent to each of the plurality of cases stored in the case base comprises the steps of:
    assigning a comparison sum to each comparison of a contextual antecedent to a case antecedent, wherein the comparison sum is equal to the number of sequentially matching words between the contextual antecedent and the case antecedent;
    assigning an antecedent sum to each case antecedent, wherein the antecedent sum is equal to the comparison sum divided by the higher of the number of words in the contextual antecedent and the case antecedent; and
    assigning a case sum to each case, the case sum determined by summing each antecedent sum for the particular case and dividing by the number of antecedents in that particular case.

3. The computer-implemented method of claim 2, wherein the step of selecting the case having the case antecedents that best match the contextual antecedents comprises selecting the case from the case base having the highest case sum.

4. The computer-implemented method of claim 3, wherein if two or more cases have the same case sum, the most-recently used case is selected.

5. The computer-implemented method of claim 3, wherein if two or more cases have the same case sum, the most-recently acquired case is selected.

6. The computer-implemented method of claim 1, wherein the step of receiving feedback from the user regarding the displayed case consequent comprises receiving confirmation that the displayed case consequent is correct.

7. The computer-implemented method of claim 1, wherein the step of receiving feedback from the user regarding the displayed case consequent comprises receiving confirmation that the displayed case consequent is incorrect.

8. The computer-implemented method of claim 7 further comprising the steps of, after receiving confirmation from the user that the displayed consequent is incorrect:
    prompting the user to specify a correct response;
    receiving a correct response from the user;
    replacing the displayed consequent of the selected case with the correct response from the user; and
    moving the case to the head of the case base.

9. The computer-implemented method of claim 1, wherein the displayed consequent is in the form of a question and feedback from the user is a response to the question.

10. The computer-implemented method of claim 9 further comprising the step of adding the received user feedback to the contextual antecedents to create a revised contextual antecedent.

11. The computer-implemented method of claim 10 further comprising the steps of:
    comparing each antecedent of the revised contextual antecedent to each of the cases stored in the case base;
    selecting the case having the case antecedents that best match the contextual antecedents; and
    displaying the case consequents of the selected case to the user.

12. The computer-implemented method of claim 1, wherein the step of displaying the case consequents of the selected case to a user includes displaying a possibility associated with the case consequent, the possibility computed using the formula $$possibility(case_k) = \frac{1}{m}\sum_{i=1}^{m} \frac{sum_i \mid sum_i \geq sum_\square, j = 1, 2, \ldots, n}{\max(|contextual\ antecedent_j|, |case\ antecedent_i|)},$$

where there are m case antecedents and n contextual antecedents, and the ith case antecedent attains its maximal value, $sum_i$, when paired with the jth contextual antecedent.

13. A non-transitory computer-readable storage medium having a method stored thereon, the method represented by computer-readable programming code, the method comprising the steps of:

receiving a user-specified context comprising one or more natural language contextual antecedents;

for each contextual antecedent, creating a modified contextual antecedent by converting each contextual antecedent to a sequence of integers using a word base;

comparing each modified contextual antecedent to each of a plurality of cases stored in a case base, each case comprising one or more case antecedents and one or more case consequents, wherein the case antecedents and case consequents are stored in the case base as sequences of integers representing the respective case antecedents and case consequents, by assigning a comparison sum to each comparison of a contextual antecedent to a case antecedent, wherein the comparison sum is equal to the number of sequentially matching words between the contextual antecedent and the case antecedent, assigning an antecedent sum to each case antecedent, wherein the antecedent sum is equal to the comparison sum divided by the higher of the number of words in the contextual antecedent and the case antecedent, and assigning a case sum to each case, the case sum determined by summing each antecedent sum for the particular case and dividing by the number of antecedents in that particular case;

selecting the case having the case antecedents that best match the contextual antecedents;

displaying the case consequents of the selected case, and a possibility associated with the case consequents, to a user; and receiving feedback from the user regarding the displayed case consequent.

14. The non-transitory computer-readable storage medium of claim 13, wherein the step of receiving feedback from the user regarding the displayed case consequent comprises receiving confirmation that the displayed case consequent is incorrect.

15. The non-transitory computer-readable storage medium of claim 14, wherein the method further comprises the steps of, after receiving confirmation from the user that the displayed consequent is incorrect:

prompting the user to specify a correct response;

receiving a correct response from the user;

replacing the displayed consequent of the selected case with the correct response from the user; and moving the case to the head of the case base.

16. The non-transitory computer-readable storage medium of claim 13, wherein the step of selecting the case having the case antecedents that best match the contextual antecedents comprises selecting the case from the case base having the highest case sum.

17. The non-transitory computer-readable storage medium of claim 13, wherein the displayed consequent is in the form of a question and feedback from the user is a response to the question, and wherein the method further comprises the steps of:

adding the received user feedback to the contextual antecedents to create a revised contextual antecedent;

comparing each antecedent of the revised contextual antecedent to each of the cases stored in the case base;

selecting the case having the case antecedents that best match the contextual antecedents; and displaying the case consequents of the selected case to the user.

18. A system comprising:

a central computer having a computer input device and a display device connected thereto; and a plurality of distributed processors communicatively coupled to the central computer wherein the central computer is configured to coordinate the activities of the distributed processors, wherein each of the distributed processors is configured to maintain a local case base and a word base, wherein each of the plurality of distributed processors are configured to perform a method including the steps of:

receiving, via the computer input device, a user-specified context comprising one or more natural language contextual antecedents;

for each contextual antecedent, creating a modified contextual antecedent by performing a bisection search of a word base and converting each contextual antecedent to a sequence of integers using the word base;

comparing each modified contextual antecedent to each of a plurality of cases stored in a case base, each case comprising one or more case antecedents and one or more case consequents, wherein the case antecedents and case consequents are stored in the case base as sequences of integers representing the respective case antecedents and case consequents;

selecting the case having the case antecedents that best match the contextual antecedents;

displaying, via the display device, the case consequents of the selected case to a user; and receiving, via the computer input device, feedback from the user regarding the displayed case consequent.

* * * * *